July 28, 1959 P. F. HAYNER ET AL 2,896,588
ELECTRO-HYDRAULIC SERVO VALVE
Filed April 4, 1956 2 Sheets-Sheet 1

Paul F. Hayner
Zenny Olsen
INVENTORS.

Paul F. Hayner
Zenny Olsen
INVENTORS.

United States Patent Office 2,896,588
Patented July 28, 1959

2,896,588

ELECTRO-HYDRAULIC SERVO VALVE

Paul F. Hayner and Zenny Olsen, Nashua, N.H., assignors, by mesne assignments, to Sanders Associates, Inc., Nashua, N.H., a corporation of Delaware Application April 4, 1956, Serial No. 576,216

11 Claims. (Cl. 121—46.5)

The subject matter of this invention is directed to electro-hydraulic servo valves which have a flow of hydraulic fluid proportional to a control signal and, more particularly, is directed to two-stage valves of this type utilizing electric control signals.

Hydraulic valves used to effect mechanical motion in response to an electrical control signal are well known. Initially, such valves, were single-stage devices in which the electrical signals were applied to a solenoid which was either integral with or directly linked to a piston valve whose motion controlled the pressure of an hydraulic flow in proportion to the intensity of the control signal. Such directly operated control valves, due to the high hydraulic forces reacting against the piston valve, require high-power solenoids. The need for high-level control signals to activate such solenoids and the extensive motion of the solenoids to effect control over an adequate range results in valves of this type having relatively low-frequency response. More recently, so-called two-stage valves have been developed to alleviate these power and frequency limitations. In a two-stage valve the armature of the torque motor does not directly actuate the main control piston valve but controls a small, relatively low-inertia auxiliary control valve. The relatively small motion of the auxiliary control valve is amplified hydraulically to control the motion of the main valve which, in turn, controls the flow of relatively large quantities of high pressure fluid used to impart motion to the machine or other controls of the device of which the valve is a part.

One form of two-stage valve is described in U.S. Patent 2,625,136 to W. C. Moog, Jr. In this two-stage valve a reed-like member is held in a balanced position under tension by balancing effects of a spring, a magnetic field and hydraulic pressure. Preferably, the reed is moved by changes in the magnetic field. Any slight change in the field will upset the hydraulic-spring balance resulting in an hydraulic pressure change acting on a main piston valve. This type of two-stage valve, though an improvement over the one-stage valve, has many deficiencies and limitations. It is necessary in the Moog valve to have highly filtered oil in both the second and first stages because of the inherent low stiffness of the valve's second stage. This results in the use of large, cumbersome filters required to filter comparatively high quantity of flow through the second stage. Full hydraulic force is obtainable only when the reed is fully displaced. Any slight change in the tension of the spring or the hydraulic pressure or even in the strength of the magnetic field upsets the balance on the reed and consequently results in uncertain neutral positions and other spurious control effects. In addition, in order that the control effected by the reed be sensitive and nearly linear, it is essential that the response of the spring and of the magnetic forces on the reed be equal and opposite over the normal range of movement of the reed. Otherwise, the reed is extremely sensitive to changes in pressure of the hydraulic fluid. In practice due to the inherent non-uniform nature of magnetic fields and the need for moving the reed over a wide range from a neutral position to effect full control, the control resulting from the movement of the reed is non-linear. This valve also lacks stiffness when no control signal is being developed, since the second-stage valve is highly susceptible to stray Bernoulli effects, friction caused by oil contamination and to random changes in hydraulic pressure.

More recently another type of two-stage valve has been described which does not have the deficiencies and limitations of the Moog valve. This two-stage valve is the subject matter of applicant's copending application, Serial No. 544,218. The valve described in that application employs a small, low-inertia control piston or pilot valve responsive to the electrical control signal. The pilot valve is mounted within an extension of the main piston valve and is movable with respect to the main valve. Electrical motor means are mounted on this extension to control the pilot valve. In operation, an electrical signal initiates movement of the pilot valve causing a change in the hydraulic pressures acting on the main piston valve and resulting in motion of the main piston valve. The main piston valve moves in a direction to rebalance these pressures and thereby reposition the main piston valve with respect to the pilot valve in a balanced or no-signal condition. Movement of the main piston valve effects desired enhanced changes in hydraulic pressures and these pressures are utilized to fulfill the purpose of the servo valve. This two-stage valve, in addition to having the desirable characteristics of high-frequency response and of requiring only relatively low-level control signals, has a substantially linear response and, due to the internal feedback between the main and pilot valves, exhibits desirable stiffness to minor system fluctuations. This valve also has the highly desirable characteristic of utilizing the full pressure of the hydraulic system with slight motion of the pilot valve brought about by extremely small electrical power.

Though the two-stage valve just described is entirely satisfactory for many applications, there are certain features of this valve which are occasionally considered undesirable. Both the field windings and the armature of the motor are mounted on moving members. This requires the leads coupling the field windings to the valve housing to be flexible and during the operation of the valve to be substantially continuously flexed. It is desirable to dispense with flexible leads of this type. Additionally, there is the feature that the motor, including both the armature and the field windings, is surrounded by the hydraulic fluid used in the valve. This can have many undesirable effects. If the hydraulic fluid is corrosive it will eventually so effect the motor as to make it inoperative. Even if the hydraulic fluid is not corrosive but is conductive, such fluid in the vicinity of the armature and field windings greatly decreases the efficiency of operation of the motor. Additionally, regardless of how finely filtered the hydraulic fluid may be there is always the possibility of collecting metallic silt, filings and other metal abrasion material which tends to adhere to the exposed armature, thereby changing its characteristic of operation. For these reasons it is desirable to have a completely sealed motor, preferably including both the field windings and the armature, though the armature, if desired, may remain exposed to the hydraulic fluid.

Accordingly, in general, the hydraulic valve in accordance with the present invention is a two-stage type of valve similar to the one described in applicant's copending application Serial No. 544,218. This valve differs from that valve in having the field windings of the motor sealed to the valve housing, thereby dispensing with flexible leads and protecting the field windings. The armature except for slight metallic protrusions may also be sealed within the confines of the field windings and the pilot valve is, in addition to being hydraulically coupled to the piston valve, also spring coupled to this valve instead of to the valve housing. Additionally, the improved valve has a "fail-safe" feature to be described more fully hereinafter.

It is therefore an object of the present invention to provide a new and improved electro-hydraulic servo valve of the two-stage type which has an exceptionally high response frequency.

It is a further object of the present invention to provide a new and improved electro-hydraulic servo valve of the two-stage type which is extremely simple, has a minimum of moving parts and is relatively easy to manufacture.

It is a still further object of the present invention to provide a new and improved electro-hydraulic servo valve of the two-stage type which is capable of employing corrosive or conductive fluid.

It is still an additional object of the present invention to provide a new and improved electro-hydraulic servo valve of the two-stage type in which the hydraulic fluid used in the second stage may be relatively unfiltered.

Yet another object of the invention is to provide a new and improved electro-hydraulic servo valve of the two-stage type providing a high degree of reliability.

Still another object of the invention is to provide a new and improved electro-hydraulic servo valve particularly adaptable to a compact design.

In accordance with the present invention an electro-hydraulic servo valve comprises a valve housing including passages for fluid under pressure and a piston valve movably mounted within the housing for controlling the flow of fluid through these passages. The servo valve also includes a pressure fluid chamber and auxiliary passages including a passage bounded by the piston valve and the housing and an orifice for introducing fluid under pressure into this chamber. The servo valve also includes a pilot valve movably mounted with respect to the orifice and mechanically coupled to the piston valve while movable with respect thereto for effecting motion of the piston valve with respect to the housing by varying the effective size of the orifice to change the pressure of the fluid in the chamber. Finally, the servo valve comprises motor means for moving the pilot valve with respect to the orifice in response to the control signal.

For a better understanding of the present invention, together with other and further objects thereof, reference is made to the following description taken in connection with the accompanying drawings and its scope will be pointed out in the appended claims.

Figures 1, 2:
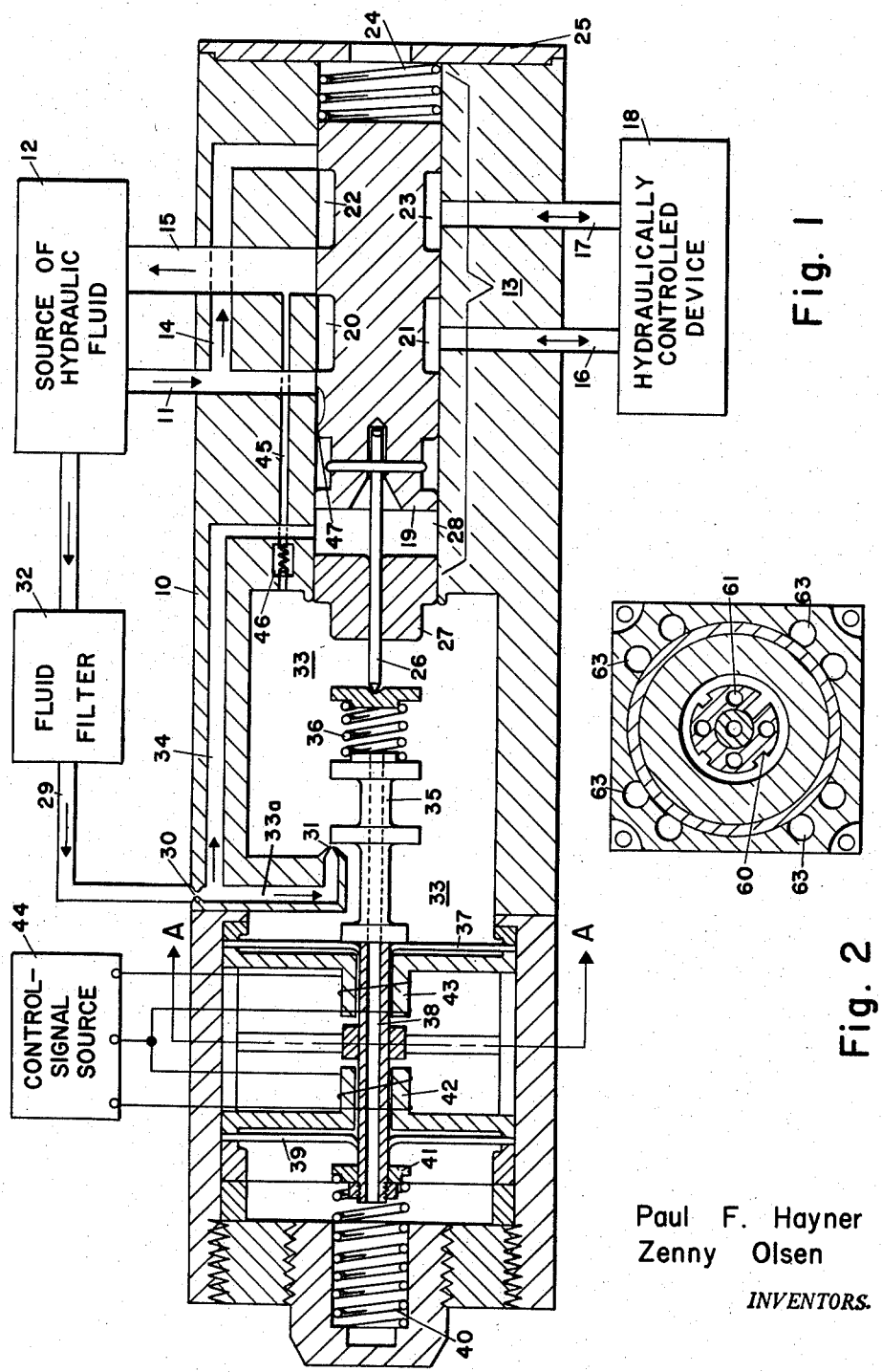
Fig. 1 is a diagrammatic cross sectional view of a two-stage electro-hydraulic servo valve in accordance with the present invention.
Fig. 2 is a diagrammatic view of a motor means which may be used in the valve of Fig. 1 taken through the section A—A of Fig. 1.

*Description of the valve of Fig. 1*

Fig. 1 represents an electro-hydraulic servo valve of the single-ended or unbalanced type in which control of the piston valve by the pilot valve is exercised in opposition to a biasing spring for the piston valve. More specifically, the servo valve of Fig. 1 comprises an oblong valve housing 10 of rectangular cross section as seen in Fig. 2 including passages for fluid under pressure. The housing 10 may be of any exterior form, preferably being a rectangular block for ease of mounting. The passages comprise an input conduit 11, having a branch passage 14, both coupled between a source of hydraulic fluid 12 and a cavity 13 in the housing. The conduits 11 and 14 exterior to the housing may be of conventional tubular form. The portions of these conduits in the housing are usually bores of circular cross section. The cavity 13 is substantially a bore of circular cross section suitable for accommodating a piston valve of generally cylindrical shape to be described hereinafter. The passages for fluid under pressure also include a return passage 15 coupled between the bore 13 and the source of hydraulic fluid 12 and a pair of output passages 16 and 17 coupled between the bore 13 and an hydraulically controlled device 18.

In accordance with the one form of the invention there is provided a two-stage, hydraulic servo valve. The valve includes a valve body having passages for fluid under pressure and control valve means disposed in the body. A control slide piston valve is movably mounted within the body for controlling the flow of fluid through the passages. Pilot valve means are disposed in the body. The pilot means include a pilot variable fluid-pressure chamber, a pilot low-pressure chamber and a pilot fluid control port interconnecting the chambers. A pilot valve member is movably mounted with respect to the port for motion along an axis for varying the effective size of the opening of the port to change the fluid pressure in the variable chamber. The variable chamber is hydraulically directly coupled to an end of the piston-valve to effect motion thereof relative to the body along the same axis as the pilot member and opposing the motion of the pilot valve member. Motor means are provided for displacing the pilot valve member relative to the port in response to a control signal to supply a flow of fluid from the control valve means. Bias means are coupled to the movable pilot member for developing a bias force acting on the pilot member and opposing the motor means. Resilience means mechanically couple the pilot member and the control piston-valve. The motion of the piston-valve tends to oppose the pilot member and the bias means to restore the pilot member to an equilibrium position to produce degenerative feedback between the control and pilot valve means and provide the two-stage, hydraulic servo valve.

The electro-hydraulic servo valve of Fig. 1 also includes a piston valve 19 movably mounted within the housing 10 and having circumferential grooves for coupling the passages to control the flow of fluid therethrough. The valve 19 is a body of generally cylindrical shape of such diameter as to fit within the cylindrical bore 13 with extremely small clearance between the outer surface of the valve 19 and the wall of the bore 13. Preferably, the clearance between these members is so small as effectively to provide an hydraulic seal between the members. The valve 19 is axially movable along the bore 13 and includes grooved or underlapped areas 20, 21, 22 and 23. The areas 20 and 21 may, for example, be provided by one circumferential groove and the areas 22 and 23 by another. The positioning of the grooved areas 20–23, inclusive, with respect to the fluid passages 11 and 14–17, inclusive, determines the control of the fluid through these passages. A biasing spring 24 is positioned in the cavity 13 between one end wall of the valve 19 and an end wall of the cavity provided by an end cap 25. A rod-like member 26 is affixed to the other end of the valve 19 and extends beyond the cavity 13 through a bearing surface in a closure cap 27. The rod 26 is axially movable in the cap 27 to follow the motion of the piston valve 19 and fits snugly within the bearing formed by the cap 27 to provide an hydraulic seal for this end of the cavity 13.

The electro-hydraulic servo valve of Fig. 1 also includes a pressure fluid chamber, specifically the chamber 28 in the cavity 13 between end cap 27 and one end of the valve 19. Auxiliary passages including a passage bounded by the piston valve 19 and the housing 10 and an orifice for introducing fluid under pressure into this chamber are also provided. More specifically, a passage 29 communicates through a constriction 30 and variable pressure chamber 33a to an orifice 31 to couple the source of fluid 12 from a fluid filter 32 to an open area 33 within the body 10. The variable pressure chamber 33a is hydraulically coupled to an end of the valve 19, as shown. Another passage 34 connects the passage 29 to the pressure fluid chamber 28, while a return passage 45 having a back pressure check valve 46 connects the open area 33 through the main return passage 15 to the source of fluid 12. In addition to these the auxiliary passages include a passage bounded by the piston valve 19 and the housing 10, more specifically, the undercut section 47 of the piston 19. The spacing between the piston 19 and the housing 10 at the undercut 47 provides a passage from the source 12 which is effectively parallel to the passage 29. Though shown as undercut, in practice there is apt to be sufficient clearance between the valve 19 and the housing 10 to provide adequate flow for the orifice or nozzle 31. The filter 32 is, for example, of sintered stainless steel of 2 micron gauge. The passages are, for example, cylindrical bores having diameters of the order of 50 thousandths of an inch, while the constriction 30 narrows this diameter to approximately 6 thousandths and the orifice 31 has an opening of approximately 12 thousandths of an inch.

The electro-hydraulic servo valve also includes a pilot valve movably mounted with respect to the orifice and mechanically coupled to the piston valve, while movable with respect thereto for effecting motion of the piston valve with respect to the housing by varying the effective size of the orifice to change the pressure of the fluid in the pressure chamber. More specifically, the pilot valve comprises a spool-like member 35 mechanically coupled to the piston valve through a spring 36 and linked through a flexible diaphragm 37 to an armature 38. The other end of the armature 38 is connected through another flexible diaphragm 39 to a shaft for supporting a biasing spring 40 which is positioned between an end of the housing 10 and a flange 41 on the shaft. Diaphragms 37 and 39 may be of very thin stock, for example, a few thousandths of an inch of aluminum, and provide bearing surfaces for the armature 38 and the pilot valve 35 coupled thereto. The members 37 and 39 exert substantially no forces along the axis of the valve, permitting axial movements of the armature and pilot valve, but preclude transverse motion. They also seal the motor means next to be described and at least the central portion of the armature 38 from the fluid outside the volume enclosed by the diaphragms.

The electro-hydraulic servo valve also includes motor means, specifically, an electromagnet device, for moving the pilot valve with respect to the orifice in response to a control signal. More specifically, such motor means includes field windings 42 and 43 enclosing the armature 38 and coupled in a balanced manner to control signal source 44. Source 44 may comprise, for example, a gyro compass in an aircraft.

*Explanation of operation of the valve of Fig. 1*

Before considering the over-all operation of the valve it is important to understand the operation of the second stage valve or piston valve 19 to effect control of such devices as airplane elevators, ailerons, rudders and similar devices. Referring now to that portion of Fig. 1 including the valve 19, as the valve 19 is moved to the left in the drawing, that is away from the end cap 25, the passage 11 is coupled through the grooved passages 20 and 21 to the output passage 16 and thus the hydraulic fluid under pressure in source 12 is applied to the hydraulically controlled device in one sence, for example, in the sense of moving the controls of an aircraft to cause it to climb. At the same time the passage 17 temporarily becomes an exhaust passage and is coupled through the grooved passages 23 and 22 to the return passage 15 to effect return of fluid to the source 12. If, on the other hand, the valve 19 is moved to the right, control of the device 18 in the opposite sense is effected. The fluid under pressure then flows through the passage 14, the grooves 22 and 23 and the passage 17 into the device 18, while the return fluid flows through the passage 16, the grooves 21 and 20, and the return passage 15 back to the source 12.

To effect control of the piston valve 19 a pilot valve 35 is employed. The pilot valve 35 is actuated in response to control signals from the source 44 acting on the armature 38 against the forces of the biasing spring 40. While the pilot valve 35 is in a static or neutral position, fluid flows from the source of hydraulic fluid 12 through the filter 32, the passage 29, constriction 30, out the orifice 31, check valve 46 and through the return passages 45 and 15 back to the source 12. The check valve 46 prevents back pressure developed in the exhaust passage 15 from disturbing the fluid flowing from the nozzle 31. The flow of this fluid in the area between the constriction 30 and the orifice 31 develops a back pressure due to the constriction of the flow at these points. This pressure is applied through the passage 34 to the pressure chamber 28 where it acts against one end of the valve 19 in opposition to the bias of the spring 24 acting against the other end. As designed, the pressure in the area 28 with respect to the bias of the spring 24 is such as to then maintain the valve 19 in the neutral position indicated in the drawing. If the armature 38 is moved in response to a control signal from the source 44, for example, it is moved to the left to compress the biasing spring 40, then the opening of the orifice 31 is effectively reduced in size by the motion of the flange of the pilot valve in the direction of this orifice. This increases the pressure of the fluid in the chamber defined by the constriction 30 and the orifice 31 and consequently increases the pressure of the fluid in the pressure chamber 28. As a result the piston valve is moved to the right to compress the spring 24. If, on the other hand, the armature 38 is moved to the right so that the orifice 31 is effectively expanded, then the pressure between the orifice 31 and the constriction 30 is reduced resulting in reduction of the pressure in the chamber 28 and the motion of the valve 19 to the left.

The spring 36 coupled between the pilot valve 35 and the piston valve 19 has such a large range of compression or expansion for a force of sufficient magnitude to move the piston 19 that there is negligible transmission through this spring of the motion of the pilot valve 35. In other words, motion of the pilot valve 35 having a total movement, for example, of ± .001 inch has a negligible direct mechanical effect on the motion of the valve 19. The piston 19 has a maximum movement of ± .05 inch. On the other hand, the forces needed to move the armature 35 are of the same order of magnitude as the compression and expansion forces for the spring 39. Consequently, movement of the piston 19 does effect motion of the pilot valve 35 in the same direction. The spring 36 serves the purpose of providing a means for utilizing motion of the valve 19 to re-set the pilot valve 35 to substantially neutral position. This effect is brought about in the manner now to be described.

As the pilot valve 35 moves, for example, to the left to increase the pressure in the pressure chamber 28, the piston valve 19 is forced to the right by this increased pressure. As the valve 19 moves to the right it exerts a pull through the spring 36 to pull the pilot valve 35 to the right until the pilot valve is repositioned in substantially but not exactly neutral position, the slight deviation being caused by the single-ended nature of the forces acting on the piston 19. However, in this neutral position there are two forces acting on the pilot valve, one being the electrical force of the armature tending to move the pilot valve to the left and the other being the expansion of the spring 36 tending to move the pilot valve to the right. The spring 36 is maintained in an expanded condition only by having sufficient pressure develop in the chamber 28 to move the piston valve some distance to the right. Consequently, the piston valve is in a displaced position resulting in a control of the hydraulically controlled device 18 in one sense. An operation directly opposite to that just described occurs when the electric control signal has the opposite sense. A direct result of the operation just described is that the pilot valve is never required to move more than a few thousandths of an inch, preferably of the order of ±.001 inch to obtain all of the control needed on the piston valve 19, for example, to move the valve 19 ±.05 inch.

The above operation has assumed normal flow of fluid through the filter 32, the passage 29 and the constriction 30. If these should become clogged for any reason, the valve will still continue to function because of a "fail-safe" feature provided to compensate for such failure. If such clogging occurs, fluid will continue to flow from the input passage 11, through the undercut 47, the passage 34 and out the nozzle 31. The spacing between the piston 19 and the wall of the housing 10 provides the constriction and any variation in the opening of the nozzle 31 develops a change in pressure in the chamber 28 moving the piston 19 in the manner described above.

It will be seen from the above that the valve represented in Fig. 1 has many of the benefits described with reference to the valve in copending application Serial No. 544,218, while at the same time having a motor with field windings that are not required to flex and a motor unit which can be completely hydraulically sealed fom the remainder of the valve. It also has a "fail-safe" feature. The fluid blocked in the area between the diaphragms 37 and 39 shifts back and forth with motion of these diaphragms through the spacing between the armature and field windings. If it is not desired to seal the fluid in this area the diaphragms 37 and 39 may be perforated to permit fluid to flow through them. Additionally, in order to minimize the back pressure or damping effect that might be created by the fluid flowing through the spacing between the armature and the field windings, the armature may be fluted and otherwise grooved to provide greater freedom of flow of the fluid, for example, in the manner indicated by the grooves 60 and holes 61 in Fig. 2.

Preferably, the fluid at the end of the valve enclosing the spring 40 should be free to flow between that point and the open area 33. This is effected by utilizing a hollow armature shaft open ends in the area 33 and in the vicinity of the spring 40 so that the fluid may flow through the armature. If the amount of flow through the armature is not sufficient the housing 10 may be fluted around the motor as represented by flutings 63 in Fig. 2 to provide a greater freedom of flow of the fluid from the area of the spring 40 to the open area 33.

Figure 3:
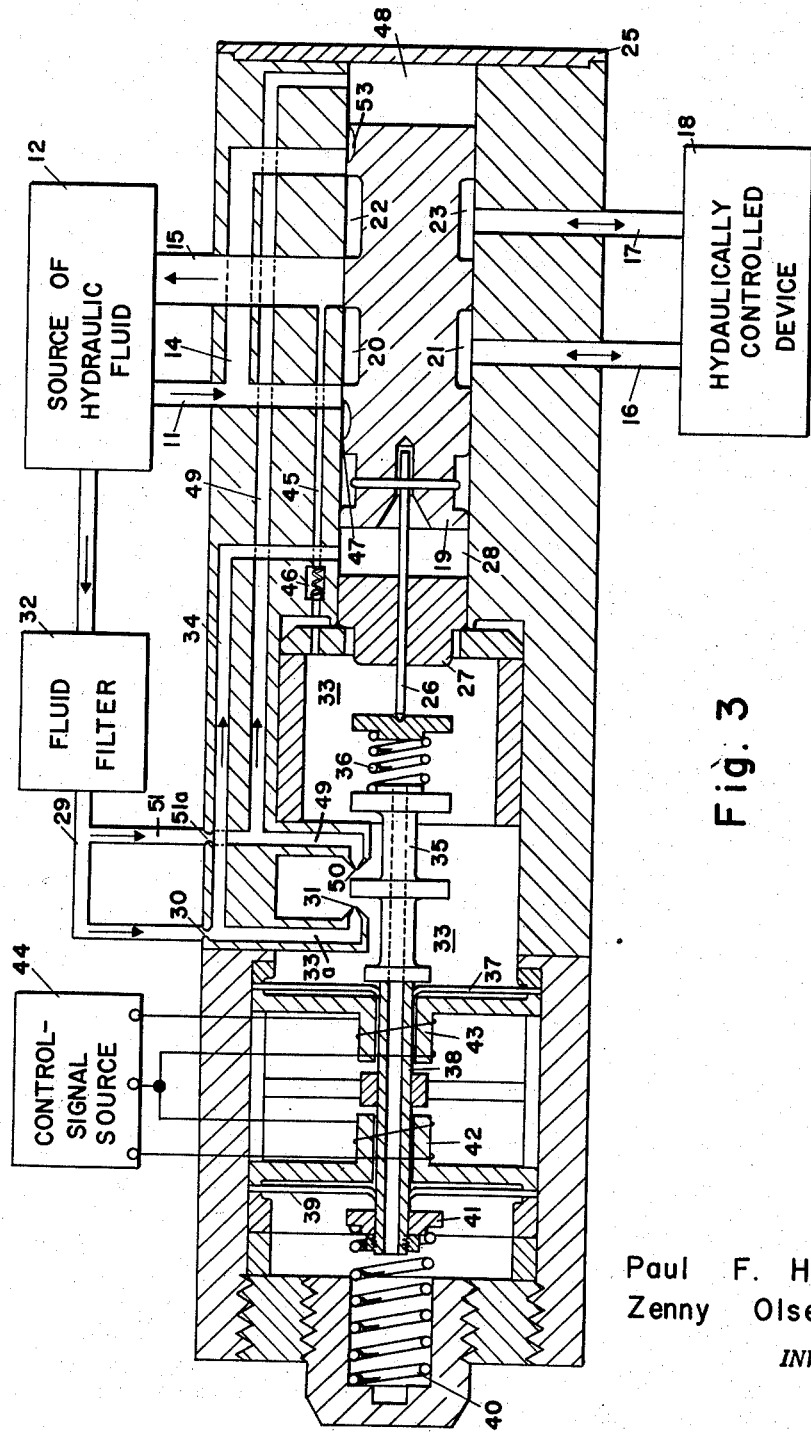
Fig. 3 is a diagrammatic cross sectional view of another embodiment of an electro-hydraulic servo valve in accordance with the present invention.

*Description and explanation of operation of valve of Fig. 3*

The valve of Fig. 1 is a single-ended, unbalanced type of valve in which the piston valve operates in opposition to the forces provided by the spring 24. A valve of this type is subject to having different operating characteristics as the pressure of the hydraulic fluid changes. The valve of Fig. 3 is a balanced type of valve using the principles of the valve of Fig. 1 but not subject to change in operating characteristics due to change in fluid pressure. More specifically, the valve of Fig. 3 is the same as the valve of Fig. 1 except for the addition of another pressure chamber 48 to replace the spring 24, an additional orifice 50 and an additional undercutting 53 of the piston 19. The pressure chamber 48 is hydraulically coupled through another passage or variable pressure chamber 49 to the orifice 50. Fluid is provided for the orifice 50 by the passage 51 through the restriction 51a coupled between the orifice and the passage 29 or, in emergency, by the undercutting 53 and the passage 49. In view of the fact that the valves of Figs. 1 and 3 are otherwise the same, other parts of these valves are identified by the same reference numerals.

In the valve of Fig. 3 fluid continuously flows through both the orifice 31 and the additional orifice 50 returning to the fluid source through the output passages 45 and 15. As the pilot valve 35 is moved, for example, to the left the fluid flow from orifice 31 is decreased creating an increased pressure in the pressure chamber 28, while the fluid flow from orifice 50 is increased creating a decreased pressure in the pressure chamber 48. As a result the piston valve is forced to move to the right pulling the pilot valve with it until the pilot valve is again in neutral position in the manner previously described with reference to Fig. 1. In the balanced valve of Fig. 3 it is to be noted that the pilot valve 35 returns to an exact neutral position with equalized pressures in the chambers 28 and 48 though the volumes of these chambers may have changed as a result of the movement of the valve 19. Valve 19 need not be in neutral position when pilot valve 35 is so positioned. In this type of balanced valve it is apparent that any changes in the fluid pressure of the system, that is the pressure of the fluid flowing from the source of hydraulic fluid 12, will have equal and opposite effects on the piston valve, and, therefore, operation of the piston valve will be insensitive to such changes.

It will be seen from the above descriptions that there is provided a two-stage electro-hydraulic servo valve which is relatively simple in construction, has few critical parts, is not critical in operation to changes in fluid pressure or to lack of filtering of the fluid. In addition to all of these benefits this valve has a completely "dry" motor in that the motor unit is separated from the hydraulic fluid flowing through the rest of the valve and has a motor which does not require flexing leads.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A two-stage, hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a pilot low pressure chamber, a pilot fluid control port interconnecting said chambers, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; motor means for displacing said pilot valve member relative to said port in response to a control signal to supply a flow of fluid from said control valve means; bias means coupled to said movable pilot member for developing a bias force acting on said pilot member opposing said motor means; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said two-stage, hydraulic servo valve.

2. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a pilot low pressure chamber, a pilot fluid control port interconnecting said chambers, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; electromagnetic motor means for displacing said pilot valve member relative to said port in response to a control signal to supply a flow of fluid from said control valve means; bias means coupled to said movable pilot member for developing a bias force acting on said pilot member opposing said motor means; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

3. An electro-hydraulic servo valve, comprising: a valve body including passages for fluid under pressure; control valve means disposed in said body and having an axially disposed, control slide piston-valve movably mounted within said body for motion along an axis for controlling the flow of fluid through said passages; pilot valve means disposed in said body and having a pilot variable fluid-pressure chamber, a pilot low pressure chamber, a pilot fluid control port interconnecting said chambers, and an axially disposed pilot valve member movably mounted with respect to said port for motion along said axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; a solenoid force motor having a stator affixed to said body and an axially disposed, armature connected to said pilot member for displacing it along said axis with respect to said pilot port in response to a control signal to supply a flow of fluid from said control valve means; bias means coupled to said movable pilot member for developing a bias force acting on said pilot member opposing said motor means; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

4. A two-stage, hydraulic servo valve, comprising: a valve body including passages for fluid under pressure; control valve means disposed in said body and having a control slide piston-valve movably mounted within said body for controlling the flow of fluid through said passage; pilot valve means disposed in said body and having a pilot variable fluid-pressure chamber, a pilot low pressure chamber, a pilot fluid control port interconnecting said chambers, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; motor means for displacing said pilot valve member relative to said port in response to a control signal to supply a flow of fluid from said control valve means; bias means coupled to said movable pilot member for developing a bias force acting on said pilot member opposing said motor means; a filter means serially connected between fluid under pressure and said pilot valve means; and resilience means mechanically coupling said pilot member and said piston-valve, the motion of said piston-valve tending to oppose said pilot member and said bias means to restore said pilot member to an equilibrium position, thereby, to provide degenerative feedback between said control and said pilot valve means.

5. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a pilot low pressure chamber, a pilot fluid control port interconnecting said chambers, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; motor means for displacing said pilot valve member relative to said port in response to a control signal to supply a flow of fluid from said control valve means; bias means coupled to said movable pilot member for developing a bias force acting on said pilot member opposing said motor means; and a feedback reference spring connected to said pilot member and having a coaxially disposed transfer rod extending through a part of said valve body to contact said piston-valve for mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

6. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a restricted orifice serially connected between fluid under pressure and said variable chamber to produce a predetermined pressure drop in said variable chamber, a pilot low pressure chamber, a pilot fluid control port inter-connecting said chambers, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; motor means for displacing said pilot valve member relative to said port in response to a control signal to supply a flow of fluid from said control valve means; bias means coupled to said movable pilot member for developing a bias force acting on said pilot member opposing said motor means; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

7. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a pilot low pressure chamber, pressure responsive check-valve means serially connected between said low pressure chamber and fluid return for maintaining a back pressure in said low pressure chamber, a pilot fluid control port interconnecting said chambers, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; motor means for displacing said pilot valve member relative to said port in response to a control signal to supply a flow of fluid from said control valve means; bias means coupled to said movable pilot member for developing a bias force acting on said pilot member opposing said motor means; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

8. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pair of pilot variable fluid-pressure chambers, a pilot low pressure chamber, a pair of pilot fluid control ports interconnecting said chambers, and a pilot valve member movably mounted between said ports for motion along an axis for varying the effective size of the opening of said ports to change the fluid-pressure in said variable chambers, said variable chambers being hydraulically directly coupled to the opposite ends of said piston-valve to effect motion thereof relative to said body along the same axis as said pilot member and opposing the motion of said pilot valve member; motor means for displacing said pilot valve member relative to said ports in response to a control signal to supply a flow of fluid from said control valve means; bias means coupled to said movable pilot member for developing a bias force acting on said pilot member opposing said motor means; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

9. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a pilot low pressure chamber, a pilot fluid control port interconnecting said chambers, and a pilot valve member movably mounted with respect to said port for motion along an axis for varying the effective size of the opening of said port to change the fluid-pressure in said variable chamber; said variable chamber being hydraulically directly coupled to an end of said piston-valve to effect motion thereof relative to said body along the same axis as said pilot member and opposing the motion of said pilot valve member; a solenoid force motor having a stator affixed to said body and an axially disposed armature connected to said pilot member for displacing it along said axis with respect to said pilot port in response to a control signal to supply a flow of fluid from said control valve means; bias means coupled to said movable pilot member for developing a bias force acting on said pilot member opposing said motor means; a pair of diaphragms centrally affixed to the opposite ends of said armature and peripherally affixed to said valve body to seal said force motor from said fluid to prevent contamination of said force motor from foreign particles; and resilience means mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

10. An electro-hydraulic servo valve, comprising: a valve body including passages for fluid under pressure; control valve means disposed in said body and having a control slide piston-valve movably mounted within said body for controlling the flow of fluid through said passages; pilot valve means disposed in said body and having a pilot variable fluid-pressure chamber, a pilot low pressure chamber, a pilot fluid control port connecting said chamber, and a pilot valve member movably mounted with respect to said port for motion along an axis for varying the effective size of the opening of said port to change the fluid-pressure in said variable chamber, said variable chamber being hydraulically directly coupled to an end of said piston-valve to effect motion thereof relative to said body along the same axis as said pilot member and opposing the motion of said pilot valve member; a solenoid force motor having a stator affixed to said body and an axially disposed armature connected to said pilot member for displacing it along said axis with respect to said control port in response to a control signal to supply a flow of fluid from said control valve means; bias means coupled to said movable pilot member for developing a bias force acting on said pilot member opposing said motor means; filter means serially connected between fluid under pressure and said pilot means for filtering pilot fluid; and a feedback reference spring connected to said pilot member and having a transfer rod extending through a part of said valve body to contact an end of said piston valve for mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

11. An electro-hydroulic servo valve, comprising: a valve body including passages for fluid under pressure; control valve means disposed in said body and having a control slide piston-valve movably mounted within said body for controlling the flow of fluid through said passages; pilot valve means disposed in said body and having a pair of pilot variable fluid-pressure chambers, a pilot low pressure chamber, a pair of pilot fluid control ports interconnecting said chambers, and a pilot valve member movably mounted between said ports for motion along an axis for varying the effective size of the openings of said ports to change the fluid pressure in said variable chambers, said variable chambers being hydraulically directly coupled to the opposite ends of said piston-valve to effect motion thereof relative to said body along the same axis as said pilot member and opposing the motion of said pilot member; a solenoid force motor having a stator affixed to said body and an axially disposed armature connected to said pilot member for displacing it along said axis with respect to said ports in response to a control signal to supply a flow of fluid from said control means; bias means coupled to said movable pilot member for developing a bias force acting on said pilot member opposing said motor means; filter means serially connected between fluid under pressure and said pilot valve means for filtering pilot fluid; and a feedback reference spring connected to said pilot member and having a transfer rod extending through a part of said valve body to contact an end of said piston-valve for mechanically coupling said pilot member and said piston-valve, the motion of said piston-valve tending to oppose said pilot member and said bias means to restore said pilot member to an equilibrium position, thereby, to produce degenerative feedback between said control and said pilot valve means and provide said servo valve.

References Cited in the file of this patent

UNITED STATES PATENTS

| | | |
|---|---|---|
| 2,146,176 | Donaldson | Feb. 7, 1939 |
| 2,582,088 | Walthers | Jan. 8, 1952 |
| 2,638,922 | Caldwell | May 19, 1953 |
| 2,650,609 | Herbst | Sept. 1, 1953 |
| 2,738,772 | Richter | Mar. 20, 1956 |